United States Patent [19]
Sato et al.

[11] Patent Number: 5,763,775
[45] Date of Patent: Jun. 9, 1998

[54] FLOW SENSOR HAVING FIRST AND SECOND TEMPERATURE DETECTING PORTIONS FOR ACCURATE MEASURING OF A FLOW RATE AND A MANUFACTURING METHOD THEREOF

[75] Inventors: Yukito Sato, Sendai; Mitsuteru Kimura, No.2-56, 3-Chome, Shiomidai, Shichigahama-Machi, Miyagi-Gun, Miyagi-Ken; Hiroyoshi Shoji, Sendai, all of Japan

[73] Assignees: Ricoh Company, Ltd., Tokyo; Ricoh Elemex Corporation, Nagoya; Ricoh Seiki Company, Ltd., Tokyo; Mitsuteru Kimura, Miyagi-ken, all of Japan

[21] Appl. No.: 815,529

[22] Filed: Mar. 12, 1997

[30] Foreign Application Priority Data

| Mar. 13, 1996 | [JP] | Japan | 8-055909 |
| Mar. 13, 1996 | [JP] | Japan | 8-055910 |
| Jan. 17, 1997 | [JP] | Japan | 9-005973 |

[51] Int. Cl.$^6$ ........................................ G01F 1/68
[52] U.S. Cl. ........................................ 73/204.26
[58] Field of Search ............... 73/204.26, 204.25, 73/204.16, 204.11

[56] References Cited

U.S. PATENT DOCUMENTS

| 5,392,647 | 2/1995 | Manaka | 73/204.26 |
| 5,423,212 | 6/1995 | Manaka | 73/204.26 |
| 5,452,610 | 9/1995 | Kleinhans et al. | 73/204.26 |

FOREIGN PATENT DOCUMENTS

| 60-142268 | 7/1985 | Japan . |
| 2-132328 | 5/1990 | Japan . |
| 5-7659 | 1/1993 | Japan . |

*Primary Examiner*—George M. Dombroske
*Assistant Examiner*—Jewel Thompson
*Attorney, Agent, or Firm*—Oblon, Spivak, McClelland, Maier & Neustadt, P.C.

[57] ABSTRACT

A flow sensor eliminates turbulence of fluid flow due to a structure of the temperature detecting portion so that a temperature of the temperature detecting portions does not fluctuate due to the turbulence of the fluid. The flow sensor is formed on a substrate. Each of a first temperature detecting portion and a second temperature detecting portion has a heating function and a temperature detecting function, and are arranged along a direction of flow of the fluid. A supporting portion is formed on the substrate for supporting the first and second temperature detecting portions thereon. The supporting portion does not have a side surface facing substantially in the direction of flow of the fluid. A side surface of the supporting portion is protected by a guard portion formed along the side surface.

36 Claims, 11 Drawing Sheets

FLOW SENSOR HAVING FIRST AND SECOND TEMPERATURE DETECTING PORTIONS FOR ACCURATE MEASURING OF A FLOW RATE AND A MANUFACTURING METHOD THEREOF

BACKGROUND OF THE INVENTION

1. Field of the Invention

The present invention generally relates to a flow sensor and a manufacturing method thereof and, more particularly, to a flow sensor having first and second temperature detecting portions which are used for measuring a flow rate or a flow speed of a fluid and a manufacturing method of the flow sensor.

2. Description of the Related Art

A flow sensor is used for measuring flow rate or flow speed of a fluid such as a fuel gas or water supply. Such a flow sensor is disclosed, for example, in Japanese Laid-Open Patent Applications No. 60-142268 and No. 2-132328 and Japanese Patent Publication No. 5-7659.

FIG. 1 is a plan view of a conventional flow sensor disclosed in the above-mentioned patent documents. The flow sensor 1 shown in FIG. 1 comprises a substrate 2 which is made of single crystalline silicon. A tunnel-like depression or cavity 3 is formed in the substrate 2 so that the opposite ends of the cavity 3 open in the front surface of the substrate 2. A thin-film supporting portion 4 having a bridge-like structure is formed over the cavity 3. Since the extending direction of the cavity 3 is parallel to the flow direction of a fluid, the thin-film supporting portion 4 extends in a direction perpendicular to the flow direction of the fluid.

An elongated thin-film heater 5 and thin-film temperature sensors 6 and 7 are provided on the thin-film supporting portion 4 so that they extend in the direction perpendicular to the flow direction of the fluid. The thin film heater 5 is located between the thin-film temperature sensors 6 and 7. That is, the thin-film temperature sensor 6 is located on the upstream side of the thin-film heater 5, and the thin-film temperature sensor 7 is located on the downstream side of the thin-film heater 5. The thin-film temperature sensor 6 and the thin-film heater 5 together constitute a first temperature detecting portion 8 which is elongated in the direction perpendicular to the flow direction of the fluid. The thin-film temperature sensor 7 and the thin-film heater 5 together constitute a second temperature detecting portion 9 which is elongated in the direction perpendicular to the flow direction of the fluid. Since the first and second temperature detecting portions 8 and 9 share the thin-film heater 5, and have the respective thin-film temperature sensors 6 and 7, each of the first and second temperature detecting portions 8 and 9 has a heating function and a temperature detecting function.

The heater 5 and the thin-film temperature sensors 6 and 7 are connected to the respective electrode terminals 10 formed near a periphery of the substrate 2. The electrode terminals 10 of the heater 5 are connected to a power source (not shown). The electrode terminals 10 of the thin-film temperature detectors 6 and 7 are connected to a detecting circuit (not shown).

A description will now be given, with reference to FIG. 2, of a manufacturing method of the flow sensor 1.

First, a single crystalline silicon substrate 2 having a square shape is prepared as shown in FIG. 2-(a). An insulating thin-film 16 and a metal thin-film 17 are sequentially formed on a surface of the substrate 2 as shown in FIG. 2-(b) and FIG. 2-(c). The insulating thin-film 16 is made of, for example, $SiO_2$, $Si_3N_4$ or $Ta_2O_5$, and is formed by a sputtering method or a chemical vapor deposition (CVD) method. The metal thin-film 17 is made of, for example, Pt or Ni, and is formed by a sputtering method or a vacuum vapor deposition method.

Thereafter, the metal thin-film 17 is patterned to form the thin-film heater 5 and the thin-film temperature sensors 6 and 7 by photo-lithography and etching as shown in FIG. 2-(d). Then, an insulating thin-film 18 is formed, as a passivation layer, on the patterned thin-film heater 5 and the thin-film temperature sensors 6 and 7. The insulating thin-film 18 is made of, for example, $SiO_2$, $Si_3N_4$ or $Ta_2O_5$, and is formed by a sputtering method or a chemical vapor deposition (CVD) method.

Thereafter, the insulating thin-films 16 and 18 are patterned, as shown in FIG. 2-(f) to form the thin-film supporting portion 4 by photo-lithography and etching so that portions of the surface of the substrate 2 are exposed in the form of the end openings of the cavity 3. Then, the cavity 3 is formed, as shown in FIG. 2-(g), between the end openings and under the thin-film supporting portion 4 by an anisotropic etching method using a KOH solution, and the manufacturing process of the flow sensor 1 is completed.

The above-mentioned flow sensor 1 is used for measuring a flow rate or a flow speed of a fluid. In order to perform such measurements, the heater 5 is activated by power supplied by the power source, and a ratio of the resistances of the thin-film temperature sensors 6 and 7 is detected by the detecting circuit.

If the fluid does not flow, the heat generated by the heater 5 is evenly transmitted to the thin-film sensors 6 and 7 via the fluid staying in the vicinity of the heater 5. Thus, the temperatures of the thin-film temperature sensors 6 and 7 are equal to each other. Thus, the ratio of the resistances of the thin-film temperature sensors 6 and 7 does not change, and the flow rate or the flow speed of the fluid, which is detected by the detecting circuit, is detected as zero.

When the fluid flows, the thin-film temperature sensor 6 of the first temperature detecting portion 8, which has been heated by the heater 5, is cooled by the fluid since the fluid flows in a direction from the thin-film temperature sensor 6 to the heater 5. On the other hand, the thin-film temperature sensor 7 of the second temperature detecting portion 9, which has been heated by the heater 5, is further heated by the fluid heated by the heater 5 since the fluid flows in a direction from the heater 5 to the thin-film temperature sensor 7.

Accordingly, a temperature difference is generated between the temperatures of the first and second temperature detecting portions 8 and 9 in response to the flow rate or the flow speed of the fluid. The ratio of the resistances of the thin-film temperature sensors 6 and 7 varies due to the temperature difference. Thus, the flow rate or the flow speed of the fluid can be measured by the detecting circuit.

In the above-mentioned flow sensor 1, since the temperature difference between the first and second temperature detecting portions 8 and 9 is generated in response to the flow rate or the flow speed of the fluid, the flow rate or the flow speed of the fluid can be measured based on the temperature difference.

However, since the thin-film supporting portion 4 having a bridge-like structure extends in a direction perpendicular to the flow direction of the fluid, a turbulence may be generated in the flow of the fluid in areas of the first and second temperature detecting portions 8 and 9. In such a case, the temperatures of the first and second temperature detecting portions 8 and 9 fluctuate and, thus, an accurate measurement of the flow rate or the flow speed cannot be performed.

Additionally, since the thin-film supporting portion 4 does not have sufficient mechanical strength and extends in the direction perpendicular to the flow direction, it is possible that the thin-film supporting portion 4 is damaged due to a collision with a foreign material floating in the fluid. The thin-film supporting portion 4 may be strengthened, for example, by increasing the thickness. However, such an attempt may increase the heat mass of the first and second temperature detecting portions 8 and 9, resulting in deterioration of sensitivity and response of the fluid sensor 1.

Further, since the tunnel-like cavity 3 is formed so as to form the thin-film supporting portion 4 having the bridge-like structure in the substrate 2, it is possible that foreign materials, such as dusts and particles, are collected between a bottom surface of the cavity 3 and a back surface of the thin-film supporting portion 4. In such a case, the cooling efficiency and the heat transmission characteristic of the thin-film supporting portion 4 is changed. Thus, a stable measurement characteristic of the flow sensor 1 cannot be obtained. Additionally, there is a possibility that the thin-film supporting portion 4 is damaged due to an increase in the fluid resistance which is caused by the collection of the foreign materials.

In the above-mentioned flow sensor 1, the measurement is performed by utilizing the transmission of the heat generated in the first and second temperature detecting portions 8 and 9. However, the heat generated in the first and second temperature detecting portions 8 and 9 is transmitted between each other by a heat conductivity of the thin-film supporting portions. Accordingly, the temperatures of the first and second temperature detecting portions do not directly dependent on the flow rate or the flow speed of the fluid. Thus, it is difficult to perform an accurate measurement of the flow rate or the flow speed with the above-mentioned flow sensor 1.

Additionally, in the flow sensor 1, if the flow rate or the flow speed of the fluid is extremely increased, the second thin-film temperature sensor 7, which is heated by the heat transmitted via the fluid, is also cooled. Thus, the flow sensor 1 has a narrow measurement range of the flow rate or the flow speed of the fluid, and it is difficult to maintain a linearity in the characteristic of the measurement.

Further, in the above-mentioned flow sensor 1, it is difficult to maintain a good sensitivity by appropriately setting a distance between the heater 5 and each of the thin-film temperature sensors 6 and 7. That is, the sensitivity of the flow sensor 1 is decreased when the thin-film temperature sensors 6 and 7 are positioned adjacent to the heater 5 since the amount of heat conducted through the thin-film supporting portion 4 is increased which results in a decrease in the amount of heat transmitted through the fluid. On the other hand, when the thin-film temperature sensors 6 and 7 are spaced away from the heater 5, the amount of heat transmitted through the fluid is decreased and, thus, the sensitivity of the flow sensor 1 is decreased.

SUMMARY OF THE INVENTION

It is a general object of the present invention to provide an improved and useful flow sensor and a manufacturing method thereof in which the above-mentioned problems are eliminated.

A more specific object of the present invention is to provide a flow sensor which eliminates turbulence of fluid flow due to a structure of the temperature detecting portion so that a temperature of the temperature detecting portions does not fluctuate due to turbulence of the fluid.

Another object of the present invention is to provide a flow sensor which eliminates collection of foreign materials floating in fluid in the temperature detecting portion so that the heat transmission is not affected by the collection of foreign materials.

A further object of the present invention is to provide a flow sensor in which a temperature detecting portion is prevented from being struck by foreign materials floating in a fluid so that the temperature detecting portion is protected from being damaged.

In order to achieve the above-mentioned objects, there is provided according to one aspect of the present invention a flow sensor for measuring a flow rate of a fluid, comprising:

a substrate;

a first temperature detecting portion and a second temperature detecting portion each having a heating function and a temperature detecting function, the first temperature detecting portion and the second temperature detecting portion being arranged in a direction of flow of the fluid; and a supporting portion, formed on the substrate, for supporting the first and second temperature detecting portions thereon, the supporting portion lacking a side surface facing substantially in the direction of flow of the fluid.

According to the above-mentioned invention, since the supporting portion formed on the substrate does not have a surface facing in the direction of fluid flow, turbulence of the fluid flow is not generated by the supporting portion. Thus, a constant heat transmission occurs through the fluid flowing around the first and second temperature detecting portions. This results in a stable measurement of the flow rate or the flow speed of the fluid which is based on a detection of temperatures of the first and second temperature detecting portions.

Additionally, since the supporting portion has no side surface which may be struck by foreign materials floating in the fluid, the supporting portion is protected from damage resulting from a strike of foreign materials.

In one embodiment according to the present invention, the supporting portion may have a diaphragm type structure to cover an opening formed in the substrate so that the flow sensor has substantially a flat surface on a side where the first and second temperature detecting portions are formed.

Since the supporting portion has a diaphragm type structure, there is no opening in the substrate on the side where the first and second temperature detecting portions are formed. Thus, a constant heat transmission occurs through the fluid flowing around the first and second temperature detecting portions. Additionally, foreign materials floating in the fluid are not collected by the supporting portion. That is, the heat transmission characteristic of the supporting portion is not changed due to collection of foreign material. This results in a stable measurement of the flow rate or the flow speed of the fluid which is based on a detection of temperatures of the first and second temperature detecting portions.

Additionally, since the supporting portion has no side surface which can be struck by foreign materials floating in the fluid, the supporting portion is protected from damage due to collision with foreign materials.

In another embodiment according to the present invention, the supporting portion may have a bridge-like structure extending in the direction of flow of the fluid, the supporting portion bridging over a cavity formed in the substrate so that the flow sensor has substantially a flat surface on a side where the first and second temperature detecting portions are formed.

Since the supporting portion extends in the direction of flow of the fluid, there is no side surface facing the direction of fluid. Thus, a constant heat transmission occurs through the fluid flowing around the first and second temperature detecting portions. Additionally, foreign materials floating in the fluid are not collected by the supporting portion. That is, the heat transmission characteristic of the supporting portion is not changed due to collection of foreign material. This results in a stable measurement of the flow rate or the flow speed of the fluid which is based on a detection of temperatures of the first and second temperature detecting portions.

Additionally, since the supporting portion does not have a side surface which is perpendicular to the direction of flow, the supporting portion is substantially protected from collisions with foreign materials floating in the fluid. Thus, the supporting portion is protected from damage due to collisions with foreign materials.

The flow sensor according to the present invention may further comprise a slit formed between the first and second temperature detecting portions. The slit thermally isolates the first and second temperature detecting portions from each other. Thus, there is no heat conduction via the supporting portion between the first and second temperature detecting portions. Accordingly, the temperatures of the first and second temperature detecting portions are dependent solely on heat transfer through the fluid. This ensures an accurate measurement of the flow rate or the flow speed based on the temperatures of the first and second temperature detecting portions.

Additionally, the flow sensor according to the present invention may further comprise an isolation wall projecting from the supporting portion, the isolation wall being positioned between the first and second temperature detecting portions.

In this invention, when the fluid does not flow or move, the heat generated by the first and second temperature detecting portions is evenly transmitted to the fluid. Thus, the temperatures of the first and second temperature detecting portions are equal to each other. On the other hand, when the fluid flows, the first temperature detecting portion is cooled by the fluid while the second temperature detecting portion is not cooled because the flow of the fluid is blocked by the isolation wall located on the upstream side of the second temperature detecting portion. Thus, a large temperature difference is generated between the first and second temperature detecting portions. The measurement of the flow rate or the flow speed is performed based on the temperature difference between the first and second temperature detecting portions.

The flow sensor according to the present invention may further comprise a second isolation wall on a downstream side of the second temperature detecting portion. In this structure of the flow sensor, the second temperature detecting portion is located between the isolation wall and the second isolation wall. Thus, the flow of the fluid around the second temperature detecting portion is sufficiently blocked, and thus a large temperature difference is generated between the first and second temperature detecting portions.

Additionally, the flow sensor according to the present invention may further comprise a slit formed in the supporting portion, the slit positioned between the isolation wall and one of the first and second temperature detecting portions. The slit may be formed between the isolation wall and each of the first and second temperature detecting portions. The slit serves to thermally isolate the isolation wall which may have a large heat mass from the first and second temperature detecting portions. Thus, the measurement base on the temperatures of the first and second temperature detecting portions is not influenced by the isolation wall.

Additionally, the isolation wall may be an integral portion of the supporting portion. The isolation wall has a hollow structure.

In one embodiment of the present invention, each of the first and second temperature detecting portions may comprise a thin-film heater having a thermistor function.

Alternatively, each of the first and second temperature detecting portions may comprise a thin-film heater and a thin-film temperature sensor positioned adjacent to the thin-film heater.

In the flow sensor having the bridge-like portion, a guard portion may be formed along a side of the supporting portion so that the side of the supporting portion is protected from damage due to collision with foreign materials floating in the fluid.

Additionally, there is provided according to another aspect of the present invention a method of manufacturing a flow sensor comprising first and second temperature detecting portions formed over a cavity formed in a substrate, an isolation wall being formed between the first and second temperature detecting portions, the manufacturing method comprising the steps of:

a) forming a first insulating film and a first metal film sequentially on a single crystalline silicon substrate;

b) patterning the first metal film to form the first and second temperature detecting portions;

c) forming a second insulating film as a passivation;

d) forming a second metal film as an etching stopper;

e) patterning the second metal film to remove the second metal film in a shape corresponding to an opening of the cavity;

f) forming a third insulating film;

g) applying a resist on the third insulating film in a shape corresponding to the isolation wall;

h) removing the first, second and third insulating films by etching so that the third insulating film remains under the resist and the first and second insulating films remain under the second metal film; and i) forming the cavity by anisotropic etching through removed portions of the first and second insulating film.

According to the above-mentioned manufacturing method, the supporting portion is formed by the first and second insulating films remaining above the cavity formed in the substrate. The first and second temperature detecting portions are formed by the first metal film remaining on the supporting portion. Additionally, the third insulating film remaining on the supporting portion corresponds to the isolation wall which is located between the first and second temperature detecting portions. When the openings used for forming the cavity are provided by etching the first to third insulating films in a single process, portions of the first and second insulating films corresponding to the supporting portion are not etched since the second metal film is formed on the portion of the supporting portion.

Additionally, there is provided according to another aspect of the present invention a method of manufacturing a flow sensor comprising first and second temperature detecting portions formed over a cavity formed in a substrate, an isolation wall being formed between the first and second temperature detecting portions, the manufacturing method comprising the steps of:

a) forming a projection on a single crystalline silicon substrate, the projection having a contour corresponding to the isolation wall;

b) forming a first insulating film and a first metal film sequentially on the single crystalline silicon substrate;

c) patterning the first metal film to form the first and second temperature detecting portions;

d) forming a second insulating film as a passivation;

e) patterning the first and second insulating films so that portions of the single crystalline silicon substrate are exposed in shapes corresponding to openings of the cavity; and f) forming the cavity by anisotropic etching through the exposed portions of the single crystalline silicon substrate.

According to this invention, the supporting portion is formed by the first and second insulating films remaining over the cavity formed in the substrate. The first and second temperature detecting portions are formed by the first metal film remaining on the supporting portion. A portion of the supporting portion is protruded since the substrate had a projection before the cavity was formed. This protruded portion corresponds to the isolation wall located between the first and second temperature detecting portions. The isolation wall thus formed has a hollow shape, and the heat mass thereof is small. Additionally, the isolation wall serves as a reinforcing member of the supporting portion.

Other objects, features and advantages of the present invention will become more apparent from the following detailed description when read in conjunction with the accompanying drawings.

DETAILED DESCRIPTION OF THE PREFERRED EMBODIMENTS

Figure 1:
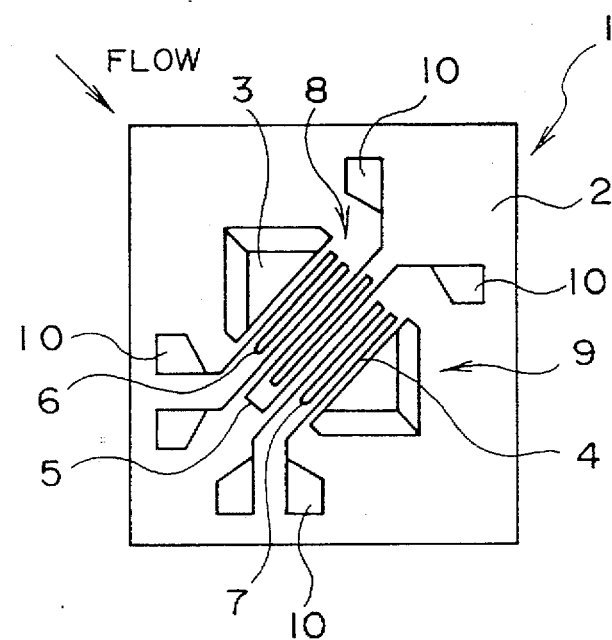
FIG. 1 is a plan view of a conventional flow sensor.
Figure 3:
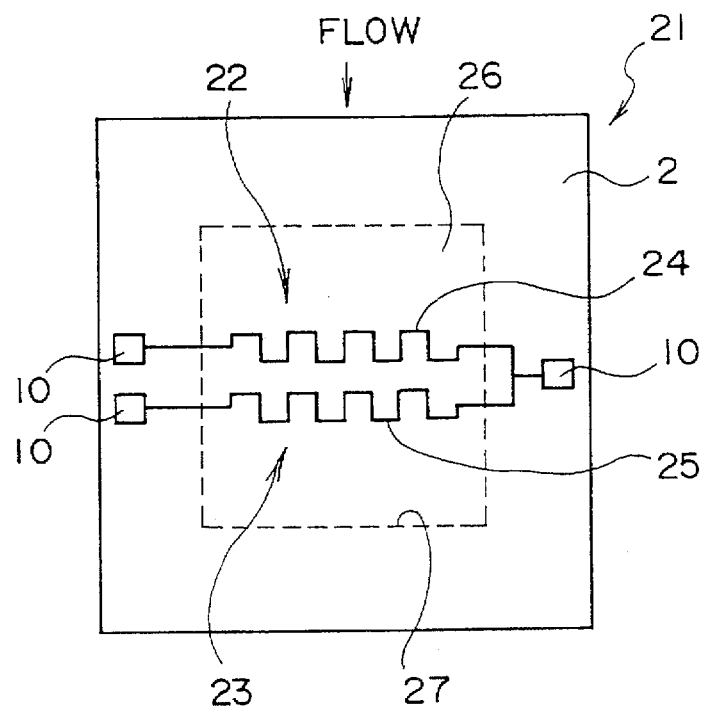
FIG. 3 is a plan view of a flow sensor according to a first embodiment of the present invention.

A description will now be given, with reference to FIG. 3, of a first embodiment of the present invention. FIG. 3 is a plan view of a flow sensor 21 according to the first embodiment of the present invention. In FIG. 3, parts that are the same as the parts shown in FIG. 1 are given the same reference numerals, and descriptions thereof will be omitted.

In the flow sensor 21, a first temperature detecting portion 22 and a second temperature detecting portion 23 are formed by thermistor thin-film heaters 24 and 25, respectively. The first temperature detecting portion 22 and the second temperature detecting portion 23 are arranged in that order in a flow direction of the fluid. The first temperature detecting portion 22 and the second temperature detecting portion 23 are formed on a supporting portion 26 of the substrate 2. The supporting portion 26 has a diaphragm structure. That is, a depression or cavity 27 is formed in the substrate 2 from a back surface thereof. The bottom of the cavity 27 corresponds to the supporting portion 26. The electrode terminals 10 connected to the first and second temperature detecting portions 22 and 23 are commonly used for supplying power thereto and detecting a temperature thereof. Accordingly, a driving and detecting circuit (not shown) is connected to the electrode terminals 10 so as to supply power to the first and second temperature detecting portions 22 and 23 and to measure the resistances of the first and second temperature detecting portions 22 and 23.

The above-mentioned flow sensor 21 measures the flow rate or the flow speed of the fluid in a manner similar to the conventional flow sensor 1. That is, the first and second temperature detecting portions 22 and 23 are activated by power supplied by the driving and detecting circuit, and a ratio of the temperatures of the first and second temperature detecting portions 22 and 23 is detected by the driving and detecting circuit.

If the fluid does not flow or move, the heat generated by the first and second temperature detecting portions 22 and 23 is evenly transmitted to each other via the fluid staying in the vicinity of the first and second temperature detecting portions 22 and 23. Thus, the temperatures of the first and second temperature detecting portions 22 and 23 are equal to each other. Further, the ratio of the resistances of the first and second temperature detecting portions does not change, and the flow rate or the flow speed of the fluid, which is detected by the driving and detecting circuit, is detected as zero.

When the fluid flows, the fluid moves in a direction from the upstream side of the first temperature detecting portion 22 to the second temperature detecting portion 23. Thus, the fluid heated by the first temperature detecting portion 22 flows to the second temperature detecting portion 23. Accordingly, the temperature difference is generated between the first and second temperature detecting portions 22 and 23 in response to the flow rate or the flow speed of the fluid. Since the ratio of the resistances of the first and second temperature detecting portions 22 and 23 varies in accordance with the temperature difference, the flow rate or the flow speed of the fluid can be measured by the driving and detecting circuit based on the change in the ratio of the resistances.

In the present embodiment, since the first and second temperature detecting portions 22 and 23 comprise the thermistor thin-film heaters 24 and 25, respectively, the heat generating function and the temperature measuring function are achieved by a single part. Accordingly, the flow sensor 21 has a simple structure which provides high productivity. Additionally, the surface area of the flow sensor 21 can be reduced to reduce the heat mass thereof so that the sensitivity and the response of the measurement is improved. Further, since one of the ends of each of the first and second temperature detecting portions 22 and 23 is commonly connected to one of the electrode terminals 10, the structure of the flow sensor is further simplified, and the connection of the driving and detecting circuit is achieved by an easy operation.

Additionally, in the flow sensor 21, since the supporting portion 26 is formed as a diaphragm structure, the entire surface of the substrate 2, on the side where the first and second temperature detecting portions 22 and 23 are formed, is flat. Thus, no fluid flow turbulence is generated in the areas of the first and second temperature detecting portions 22 and 23. Accordingly, there is no fluctuation of the temperature of the first and second temperature detecting portions 22 and 23 due to the fluid flow turbulence. This allows the flow sensor 21 to perform an accurate measurement of the flow rate or the flow speed of the fluid. Additionally, since the surface of the substrate 2 and the surface of the supporting portion 26 are in the same plane, the wiring of the first and second temperature detecting portions 22 and 23 and the electrode terminals 10 can be freely arranged.

Since the supporting portion 26 having the diaphragm structure has a higher strength than the bridge structure of the conventional flow sensor and the possibility of collision with foreign materials is low, the service life of the flow sensor 21 is extremely long. Thus, the thickness of the supporting portion 26 can be reduced and the surface area can be increased while a sufficient strength is maintained so that the heat mass of the first and second temperature detecting portions 22 and 23 is decreased to improve the sensitivity and response of the flow sensor 21.

Additionally, since the cavity 27 is formed as a simple depression, no foreign materials can be collected therein. Thus, the cooling effect and the heat transfer characteristic of the supporting portion 26 does not change, resulting in a stable measurement characteristic. Thus, there is no damage due to an increase in the fluid resistance of the supporting portion 26.

A description will now be given of a manufacturing process of the flow sensor 21.

First, a single crystalline silicon substrate 2 is prepared. The substrate 2 has a size 3.0 mm×3.0 mm×525 μm, and provided with, for example, a heat oxidation film ($SiO_2$) having a thickness of 1.0 μm formed on outer surfaces thereof. An SiC thin-film having a thickness of 3000 Å is formed on the heat oxidized film by a high-frequency sputtering method. The SiC thin-film is then patterned by photo-lithography and etching to form the first and second temperature detecting portions 22 and 23. Then, an $SiO_2$ thin-film having a thickness of 1.0 μm is formed, as a passivation, on the surface of the first and second temperature detecting portions 22 and 23.

Thereafter, the heat oxidation film on the back side of the substrate 2 is removed by etching in a size 2.0 mm×2.0 mm. The substrate 2 is anisotropically etched by a KOH solution from the opening formed in the heat oxidation film. The etching is performed so that the depth of the etched portion reaches the opposite side (front side) of the substrate 2 so as to form the cavity 27. Thus, the supporting portion 26 is formed by the heat oxidation film on the front surface of the substrate which has a diaphragm structure.

It should be noted that the present invention is not limited to the above-mentioned embodiment, and variations may be made. For example, in the above-mentioned flow sensor 21, although SiC is used to form the thermistor thin-film heaters 24 and 25, materials having a heating function with a low power consumption and a high temperature-resistance factor, such as pollycrystalline silicon or amorphous silicon may be used. Additionally, other film deposit method such as a vacuum vapor deposition method or a chemical vapor deposition method may be used instead of the sputtering method to form the film used for the thermistor thin-film heaters 24 and 25. Further, the film used for forming the supporting portion 26 is made of other insulating films made of, for example, $Ta_2O_5$ or $Si_3N_4$.

In the flow sensor 21, the first and second temperature detecting portions 22 and 23 are elongated in the direction perpendicular to the flow direction of the fluid. However, the first and second temperature detecting portions 22 and 23 can be formed in various configurations as long as the first and second temperature detecting portions 22 and 23 are arranged in a direction from the upstream side to the downstream side of the flow of the fluid.

Figure 4:
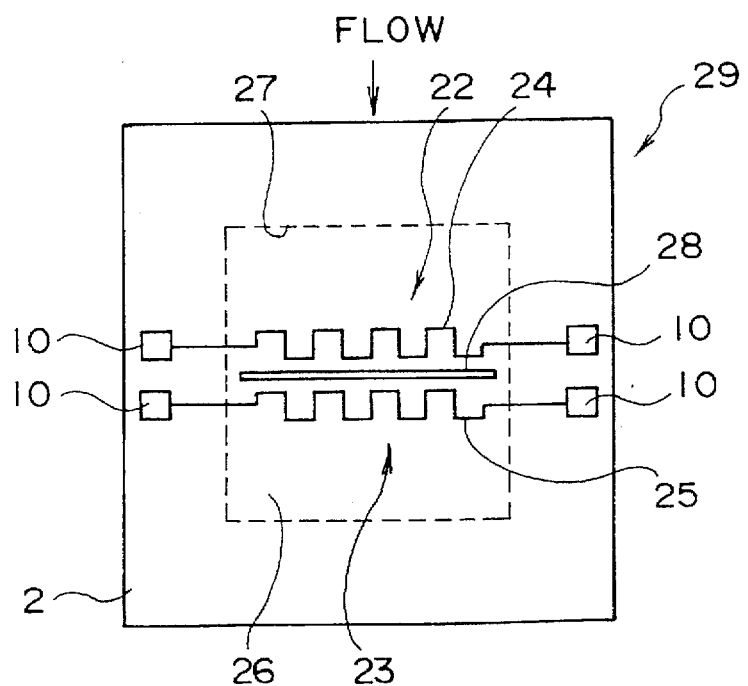
FIG. 4 is a plan view of a variation of the flow sensor shown in FIG. 3.

FIG. 4 shows a flow sensor 29 according to a variation of the flow sensor 21. As shown in FIG. 4, the flow sensor 29 has a slit 28 formed in the supporting portion 26 between the first and second temperature detecting portions 22 and 23. In this structure, the conduction of heat between the first and second temperature detecting portions 22 and 23 through the supporting portion 26 is prevented by the slit 28. Thus, the temperature of the first and second temperature detecting portions 22 and 23 accurately corresponds to the flow rate or the flow speed of the fluid, resulting in an accurate measurement of the flow rate or the flow speed of the fluid.

It should be noted that when the temperature of the fluid changes drastically, a thin-film temperature sensor (not shown in the figures) may be provided on the substrate 2 to detect the temperature of the fluid so that the first and second temperature detecting portions 22 and 23 generate heat to increase the temperature thereof by a predetermined temperature higher than the temperature of the fluid.

Figure 5:
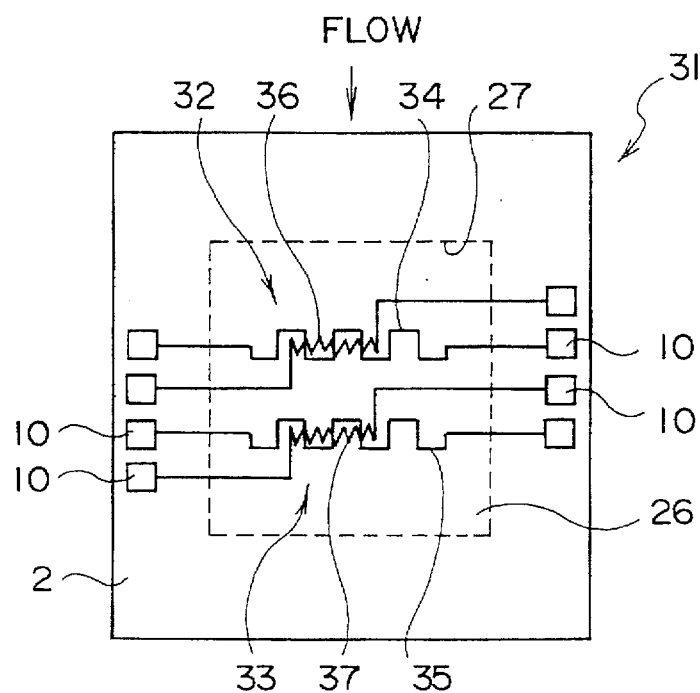
FIG. 5 is a plan view of a flow sensor according to a second embodiment of the present invention.

A description will now be given, with reference to FIG. 5, of a second embodiment of the present invention. FIG. 5 is a plan view of a flow sensor 31 according to the second embodiment of the present invention. In FIG. 5, parts that are the same as the parts shown in FIGS. 1 and 3 are given the same reference numerals, and descriptions thereof will be omitted.

In the flow sensor 31 shown in FIG. 5, a first temperature detecting portion 32 and a second temperature detecting portion 33 are formed by thin-film heaters 34 and 35 and thin-film temperature sensors 36 and 37, respectively. That is, the thin-film heater 34 and the thin-film temperature sensor 36 together form the first temperature detecting portion 32, and the thin-film heater 35 and the thin-film temperature sensor 37 together form the second temperature detecting portion 33. The thin-film heaters 34 and 35 are relatively larger than the thin-film temperature sensors 36 and 37 so that the thin-film temperature sensors 36 and 37 are formed on the respective thin-film heaters 34 and 35. Then, the thin-film heaters 34 and 35 are formed on the supporting portion 26 which has the diaphragm structure.

The first temperature detecting portion 32 is positioned on the upstream side of the second temperature detecting portion 33 with respect to the direction of flow of the fluid.

In the flow sensor 31, the thin-film heaters 34 and 35 are activated by power supplied by a power source (not shown), and a ratio of the resistances of the thin-film temperature sensors 36 and 37 is detected by a detecting circuit (not shown) so as to measure the flow rate or the flow speed of the fluid.

Since the first and second temperature detecting portions 32 and 33 comprise the exclusive thin-film heaters 34 and 35 and the exclusive thin-film temperature sensors 36 and 37, respectively, the heat generating function and the temperature detecting function of each of the first and second temperature detecting portions can be separately controlled. This provides a good measurement characteristic to the flow sensor 31. Additionally, the first and second temperature detecting portions 32 and 33 are compact since the thin-film temperature sensors 36 and 37 are formed on the thin-film heaters 34 and 35, respectively. Thus, the sensitivity and response of the flow sensor 31 is improved.

Similar to the flow sensor 21 shown in FIG. 3, the flow sensor 31 has the supporting portion having the diaphragm structure. Thus, fluid turbulence is not generated near the first and second temperature detecting portions 32 and 33, and thus an accurate measurement of the flow rate or the flow speed can be performed. Additionally, as foreign materials are not collected in the cavity 27, a stable measurement characteristic is provided. Further, supporting portion 26 is durable, and the wiring of the first and second temperature detecting portions 32 and 33 are freely designed.

A description will now be given of a manufacturing process of the flow sensor 31.

First, the single crystalline silicon substrate 2 is prepared. The substrate 2 has a size 3.0 mm×3.0 mm×525 µm, and is provided with, for example, a heat oxidation film ($SiO_2$) having a thickness of 1.0 µm formed on outer surfaces thereof. An $Ta_2N_4$ thin-film having a thickness of 3000 Å is formed on the heat oxidized film by a direct current sputtering method. The $Ta_2N_4$ thin-film is then patterned by photo-lithography and etching to form the thin-film heaters 34 and 35. Then, an $SiO_2$ thin-film having a thickness of 5000 Å is formed, as an insulating film, on the surface of the thin-film heaters 34 and 35. Then, an SiC thin-film having a thickness of 2000 Å is formed on the $SiO_2$ thin-film by a high-frequency sputtering method. The $Ta_2N_4$ thin-film is then patterned by photo-lithography and etching to form the thin-film temperature sensors 36 and 37.

Thereafter, similar to the flow sensor 21, the surface of the thin-film temperature sensors 36 and 27 is covered with an $SiO_2$ thin-film having a thickness of 1.0 µm as a passivation film. Then, the heat oxidation film on the back side of the substrate 2 is removed by etching in a size 2.0 mm×2.0 mm, and the substrate 2 is anisotropically etched so as to form the cavity 27. Thus, the supporting portion 26 is formed by the heat oxidation film on the front surface of the substrate which has a diaphragm structure.

It should be noted that the present invention is not limited to the above-mentioned embodiment, and variations may be made. For example, in the above-mentioned flow sensor 31, although $Ta_2O_5$ is used for forming the thin-film heaters 34 and 35, other materials may be used such as TaSiO or NiCr which have a heating function with low power consumption and a high temperature-resistance factor. Additionally, although the semiconductor thermistor material, SiC, is used as a material for forming the thin-film temperature sensors 36 and 37, other materials such as Pt, Ge, MnO or $Fe_2O_3$ may be used which have a high temperature-resistance factor with a good stability.

In the above-mentioned flow sensor 31, similar to the flow sensor 29 shown in FIG. 4, the first and second temperature detecting portions 32 and 33 can be thermally insulated to each other by forming the slit 28 in the supporting portion 26.

Figure 6:
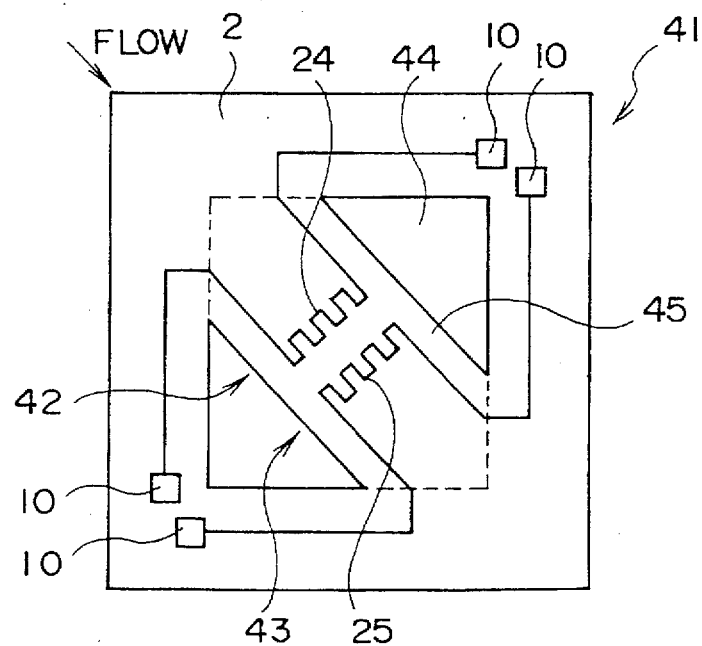
FIG. 6 is a plan view of a flow sensor according to a third embodiment of the present invention.

A description will now be given, with reference to FIG. 6, of a third embodiment of the present invention. FIG. 6 is a plan view of a flow sensor 41 according to the third embodiment of the present invention. In FIG. 6, parts that are the same as the parts shown in FIGS. 1 and 3 are given the same reference numerals, and descriptions thereof will be omitted.

In the flow sensor 41 shown in FIG. 6, a first temperature detecting portion 42 and a second temperature detecting portion 43 are formed by the thermistor thin-film heaters 24 and 25. The first temperature detecting portion 42 and the second temperature detecting portion 43 are arranged in the direction of flow of the fluid. A tunnel-like cavity 44 is formed in the substrate 2, and a supporting portion 45 bridges over the cavity 44. The supporting portion extends in a direction parallel to the direction of flow of the fluid. The first and second temperature detecting portions 42 and 43 are provided on the surface of the supporting portion 45.

In the flow sensor 41, the first and second temperature detection portions 42 and 43 are activated by power supplied by the driving and detecting circuit. Also, a ratio of the resistances of the first and second temperature detecting portions 42 and 43 is detected by the driving and detecting circuit so as to measure the flow rate or the flow speed of the fluid.

In the flow sensor 41, since the first and second temperature detecting portions 42 and 43 comprise the thin-film heaters 24 and 25, respectively, a heat generating function and a temperature measuring function are achieved by a single member. Thus, the structure of the flow sensor 41 is simple and has a high productivity. Additionally, the surface area of the flow sensor 41 can be reduced so as to reduce the heat mass thereof so that the sensitivity and the response of the measurement is improved.

Further, since the extending direction of the bridge-like supporting portion 45 is parallel to the direction of flow of the fluid, there is no fluid turbulence generated near the first and second temperature detecting portions 42 and 43. Accordingly, there is no fluctuation of the temperature of the first and second temperature detecting portions 42 and 43 due to the fluid flow turbulence. This allows the flow sensor 41 to perform an accurate measurement of the flow rate or the flow speed of the fluid. Additionally, since the extending direction of the bridge-like supporting portion 45 extends in the direction parallel to the direction of flow of the fluid, the possibility that the supporting portion 45 is struck by foreign materials floating in the fluid is low. Thus, a long service life of the sensor is achieved. Further, since there is no substantial collection of foreign materials in the cavity 44, the cooling effect and the heat transmission characteristic of the supporting portion 45 does not change, resulting in a stable measurement characteristic. Thus, there is no damage due to an increase in the fluid resistance of the supporting portion 45.

A description will now be given of a manufacturing process of the flow sensor 41.

First, a single crystalline silicon substrate 2 is prepared. The substrate 2 has a size 3.0 mm×3.0 mm×525 µm, and is provided with, for example, a thermal oxidation film (SiO$_2$) having a thickness of 1.0 µm formed on outer surfaces thereof. An SiC thin-film having a thickness of 3000 Å is formed on the heat oxidized film by a high-frequency sputtering method. The SiC thin-film is then patterned by photo-lithography and etching to form the first and second temperature detecting portions 42 and 43. Then, an SiO$_2$ thin-film having a thickness of 1.0 µm is formed, as a passivation film, on the surface of the first and second temperature detecting portions 42 and 43.

Thereafter, the passivation film and the heat oxidation film are patterned so that openings of the cavity 44 are formed. Then, the substrate 2 is anisotropically etched by a KOH solution from the openings formed in the passivation film and the thermal oxidation film. The etching is performed so that the depth of the etched portion reaches a depth of 300 µm to form the cavity 44. Thus, the supporting portion 45 is formed by the remaining thermal oxidation film and the passivation film on the front surface of the substrate 2.

It should be noted that the present invention is not limited to the above-mentioned embodiment, and variations may be made. For example, in the above-mentioned flow sensor 41, although SiC is used to form the passivation film which is a top layer of the supporting portion, materials having a sufficient strength and insulation, such as Ta$_2$O$_5$ or Si$_3$N$_4$ may be used. Additionally, although a bottom layer of the supporting portion 45 is formed by the thermal oxidation film formed on the surface of the substrate 2, the bottom layer may be formed by other insulating films made by materials such as Ta$_2$O$_5$ or Si$_3$N$_4$.

In the flow sensor 41, the first and second temperature detecting portions 42 and 43 are elongated in the direction perpendicular to the flow direction of the fluid. However, the first and second temperature detecting portions 42 and 43 can be formed in various configurations as long as the first and second temperature detecting portions 42 and 43 are arranged in a direction from the upstream side to the downstream side of the flow of the fluid.

Figure 7:
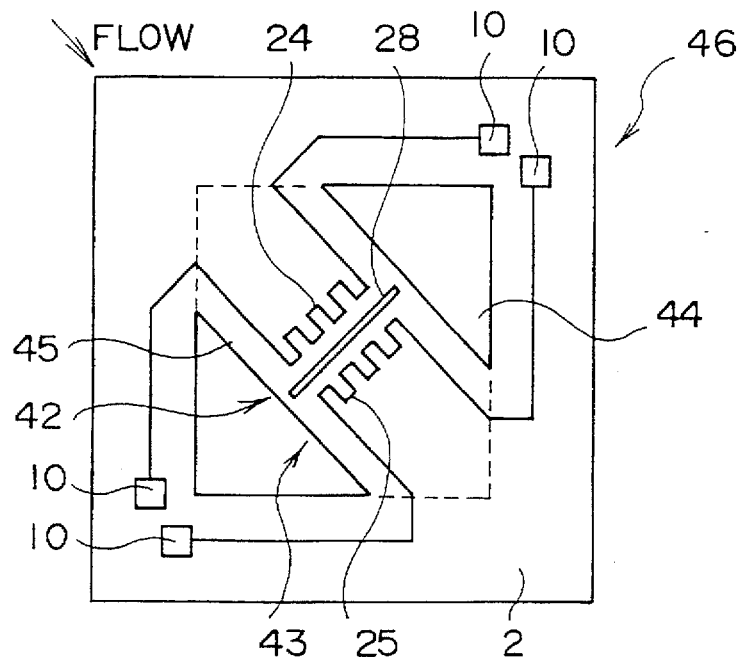
FIG. 7 is a plan view of a variation of the flow sensor shown in FIG. 6.

FIG. 7 shows a flow sensor 46 according to a variation of the flow sensor 41. As shown in FIG. 7, the flow sensor 46 has a slit 28 formed in the supporting portion 45 between the first and second temperature detecting portions 42 and 43. In this structure, the conduction of heat between the first and second temperature detecting portions 42 and 43 through the supporting portion 45 is prevented by the slit 28. Thus, the temperature of the first and second temperature detecting portions 42 and 43 accurately corresponds to the flow rate or the flow speed of the fluid, resulting in an accurate measurement of the flow rate or the flow speed of the fluid.

Figure 8:
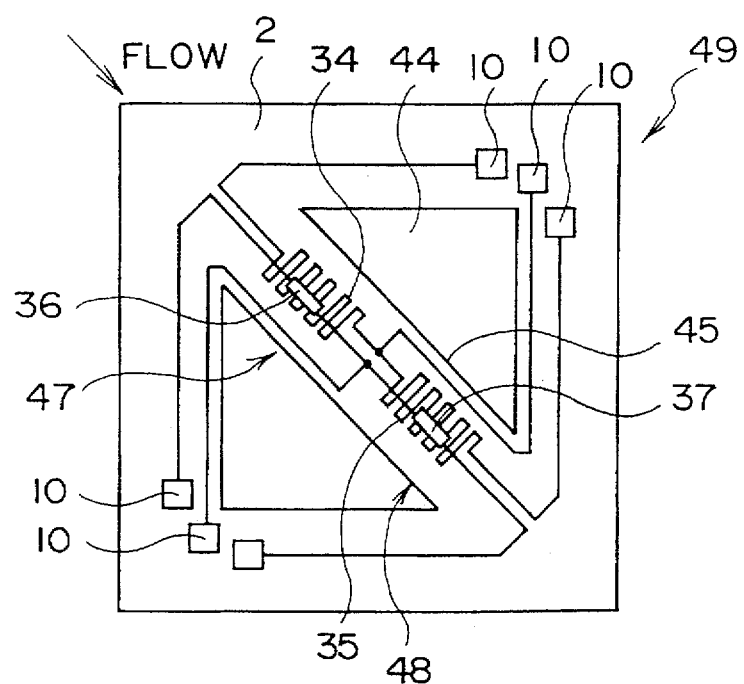
FIG. 8 is another variation of the flow sensor shown in FIG. 6.

Additionally, FIG. 8 shows a flow sensor 49 according to another variation of the flow sensor 41. As shown in FIG. 8, the flow sensor 49 comprises first and second temperature detecting portions 47 and 48 formed by the thin-film heaters 34 and 35 and the thin-film temperature sensors 36 and 37, respectively. Thus, the flow sensor 49 has a heat generating function and a temperature measuring function being separately controlled. Additionally, the first and second temperature detecting portions 47 and 48 are compact since the thin-film temperature sensors 36 and 37 are formed on the thin-film heaters 34 and 35, respectively. Thus, the sensitivity and response of the flow sensor 49 is improved. Further, since some of the electrode terminals 10 are commonly used to supply power and to measure the temperature, the wiring between the flow sensor 49 and each of the driving circuit and the detecting circuit is simple and easy.

Figure 9:
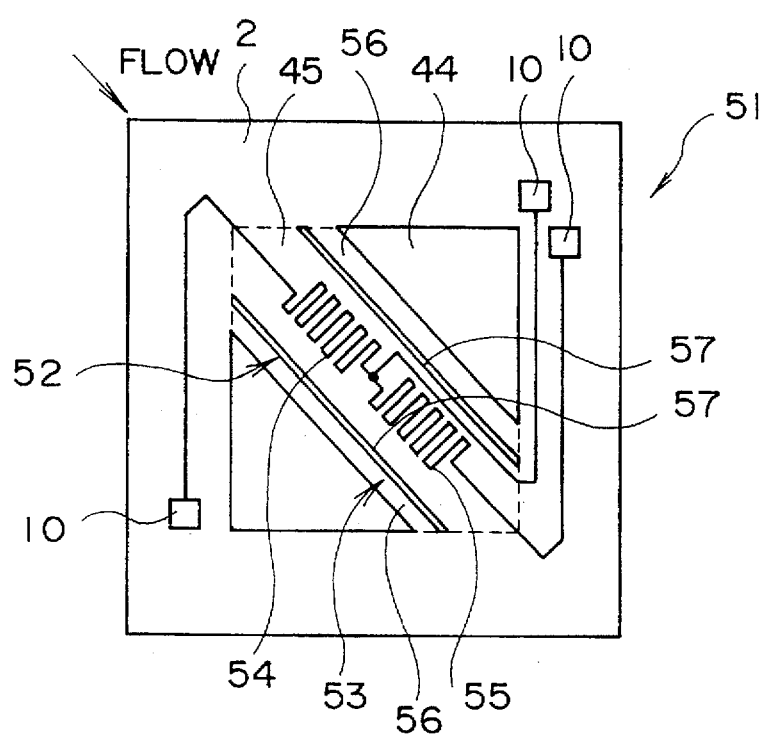
FIG. 9 is a plan view of a flow sensor according to a fourth embodiment of the present invention.

A description will now be given, with reference to FIG. 9, of a fourth embodiment of the present invention. FIG. 9 is a plan view of a flow sensor 51 according to the fourth embodiment of the present invention. In FIG. 9, parts that are the same as the parts shown in FIG. 6 are given the same reference numerals, and descriptions thereof will be omitted.

In the flow sensor 51 shown in FIG. 9, first and second temperature detecting portions 52 and 53 are formed by thermistor thin-film heaters 54 and 55, respectively. The first and second temperature detecting portions 52 and 53 are elongated in a direction perpendicular to the direction of flow, and are arranged in parallel to each other. The first and second temperature detecting portions 52 and 53 are provided on the surface of the supporting portion 45 which extends in the direction of flow. Guard portions 56 are formed on each side of the supporting portion 45 with slits 57 therebetween.

The supporting portion 45 has a width of 150 µm, for example, and each of the guard portions 56 has a width of 75 µm which is one half of the width of the supporting portion 45. The width of each of the slits 57 is 15 µm which is one tenth of the width of the supporting portion 45.

In the above-mentioned flow sensor 51, the first and second temperature detecting portions 52 and 53 are activated to generate heat by being supplied power from a driving and detecting circuit. Then, a ratio of the resistances of the first and second temperature detecting portions 52 and 53 is detected by the driving and detecting circuit so as to measure the flow rate or the flow speed of the fluid.

In the flow sensor 51, the supporting portion 45 is formed as a bridge-like structure provided with the guard portions 56 on each side. Thus, there is less possibility that foreign materials collide with the supporting portion 45. Accordingly, the heat mass of the first and second temperature detecting portion can be reduced by reducing the width or thickness of the supporting portion 45 while a sufficient strength of the supporting portion 45 is maintained. This increases the sensitivity of the response of the flow sensor 57. Additionally, the guard portions 56 can be formed when the supporting portion 45 is formed, and there is no need to use an exclusive manufacturing process of thin-film structure for the guard portions 56. Thus, the flow sensor permits high production rates.

It should be noted that the supporting portion 45 can be further protected from collision with foreign materials by increasing a height of the guard portions 56.

Figure 10:
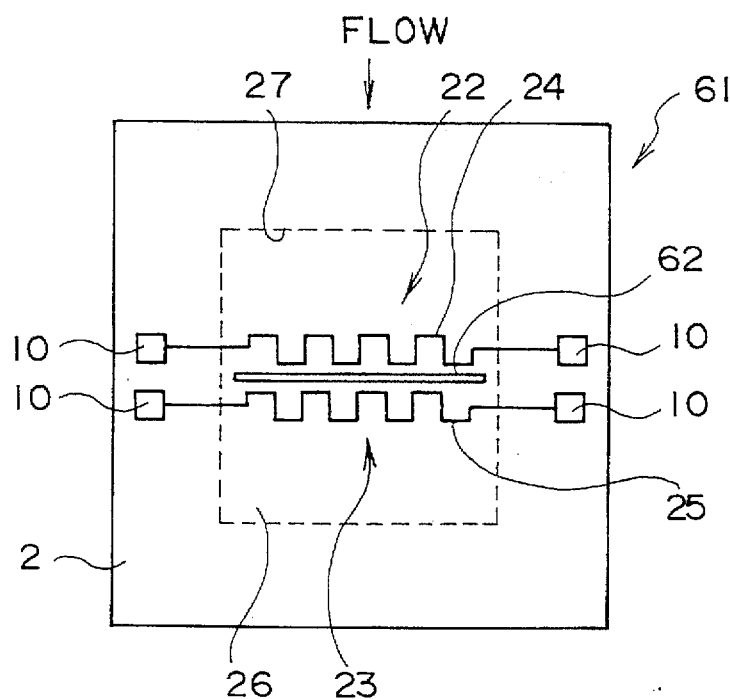
FIG. 10 is a first variation of the flow sensor shown in FIG. 9.

A description will now be given, with reference to FIG. 10, of a fifth embodiment according to the present invention. FIG. 10 is a plan view of a flow sensor 61 according to the fifth embodiment of the present invention. In FIG. 10, parts that are the same as the parts shown in FIG. 3 are given the same reference numerals, and descriptions thereof will be omitted.

In the flow sensor 61 shown in FIG. 10, an isolation wall 62 protrudes from the surface of the substrate 2 in the center of the supporting portion 26. The isolation wall 62 is located between and parallel to the first and second temperature detecting portions 22 and 23.

The first and second temperature detecting portions 22 and 23 are activated by power supplied by the driving and detecting circuit. A ratio of the resistances of the first and second temperature detecting portions 22 and 23 is detected by the driving and detecting circuit so as to measure the flow rate or the flow speed of the fluid.

If the fluid does not flow or move, the heat generated by the first and second temperature detecting portions 22 and 23 is transmitted evenly to each other via the fluid staying in the vicinity of the first and second temperature detecting portions 22 and 23. Thus, the temperatures of the first and second temperature detecting portions 22 and 23 are equal to each other. Thus, the ratio of the resistances of the first and second temperature detecting portions does not change, and the flow rate or the flow speed of the fluid, which is detected by the driving and detecting circuit, is detected as zero.

When the fluid flows, the first temperature detecting portion 22 is cooled by the fluid, and thereby the temperature of the first temperature detecting portion 22 is decreased. On the other hand, the fluid flowing to the second temperature detecting portion 23 is heated by the first temperature detecting portion 22, and the fluid around the second temperature detecting portion is prevented from movement due to the isolation wall 62. Thus, the second temperature detecting portion 23 is not cooled as much as the first temperature detecting portion 22, and the decrease in the temperature of the second temperature detecting portion 23 is less than that of the first temperature detecting portion 22. Accordingly, a temperature difference is generated between the first and second temperature detecting portions 22 and 23 in response to the flow rate or the flow speed of the fluid. Since the ratio of the resistances of the first and second temperature detecting portions 22 and 23 varies in accordance with the temperature difference, the flow rate or the flow speed of the fluid can be measured by the driving and detecting circuit based on the change in the ratio of the resistances.

Since the flow sensor 61 according to the present embodiment comprises the isolation wall 62 between the first and second temperature detecting portions 22 and 23, the second temperature detecting portion 23 is not excessively cooled when the flow rate or the flow speed of the fluid is extremely increased. Thus, the flow rate or the flow speed of the fluid can be accurately measured over a wide measurement range, and linearity of the measurement characteristics is maintained in the measurement range.

Additionally, since the temperature difference between the first and second temperature detecting portions 22 and 23 is generated by the presence of the isolation wall 62, there is no need to provide the fluid heated by the first temperature detecting portion 22 to the area of the second temperature detecting portion 23. Thus, the second temperature detecting portion 23 can be sufficiently spaced away from the first temperature detecting portion 22 to eliminate influence of the heat conduction via the supporting portion 26 so that the sensitivity and the response are improved.

It should be noted that the present invention is not limited to the above-mentioned embodiment, and variations may be made. For example, in the flow sensor 61, the first and second temperature detecting portions 22 and 23 may be formed by the combination of the thin-film heaters 34 and 35 and the thin-film temperature sensors 36 and 37 similar to the flow sensor 31 shown in FIG. 5.

Figure 11:
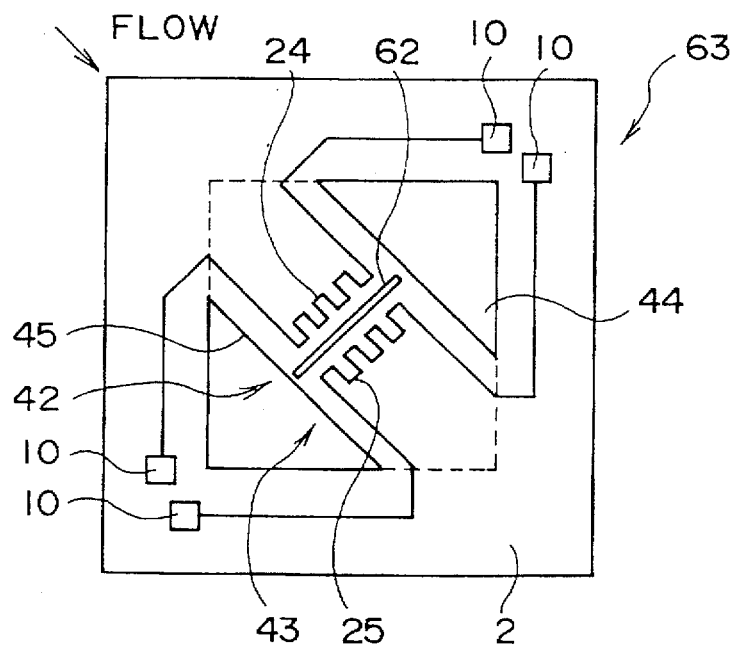
FIG. 11 is a second variation of the flow sensor shown in FIG. 9.

Additionally, in the flow sensor 61, although the first and second temperature detecting portions 22 and 23 are formed on the supporting portion 26 having a diaphragm structure, the first and second detecting portions 22 and 23 may be replaced by the first and second temperature detecting portions 42 and 43 comprising the thin-film heaters 24 and 25 formed on the supporting portion 45 having a bridge-like structure as is indicated by a flow sensor 63 shown in FIG. 11. In this variation, the isolation wall 62 is formed on the supporting portion 45 and is located between the first and second temperature detecting portions 42 and 43.

Figure 12:
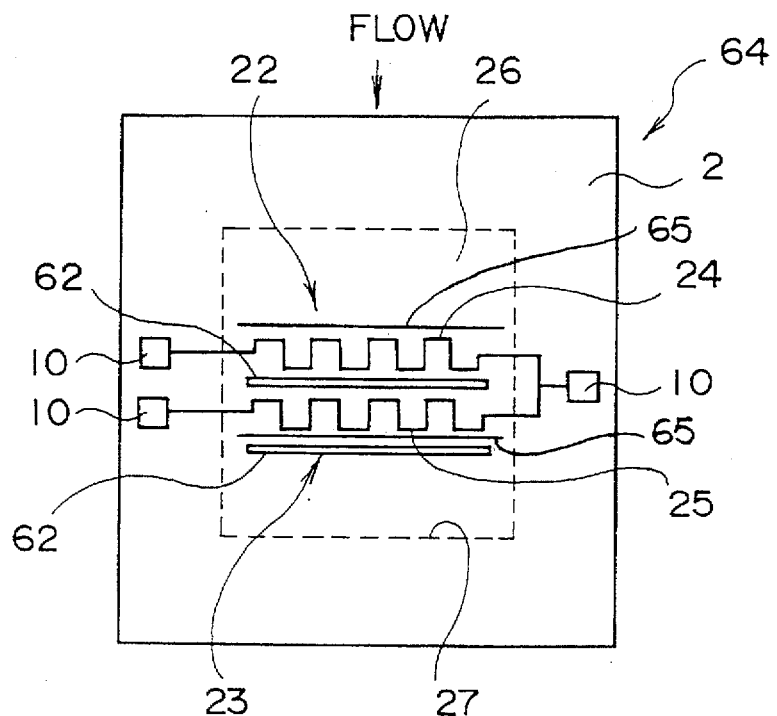
FIG. 12 is a third variation of the flow sensor shown in FIG. 9.

Further, as is indicated by a flow sensor 64 shown in FIG. 12, another isolation wall 62 may be added in a position downstream from the second temperature detecting portion 23. In the flow sensor 64, movement of the fluid above the second temperature detecting portion 23 is prevented by the pair of isolation walls 62. Thus, a more clear temperature difference is generated between the first and second temperature detecting portions 22 and 23.

Further as indicated by a flow sensor 64 shown in FIG. 12, a slit or opening 65 may be formed on the upstream side of the thin film heater 24 and another slit or opening 65 may be formed between the thin-film heater 25 and the second isolation wall 62. The formation of the slits 65 assures the temperatures of the first and second temperature detecting portions 22 and 23 being equal to each other. The width of the slit 65 is determined so that foreign particles having a considerable size cannot pass the slit 65 and a sufficient thermal insulation effect is obtained. Additionally, the second slit 65 thermally isolate the second temperature detecting portion 23 from the second isolation wall 62 so that the heat mass of the second isolation wall 62 is negligible.

Figure 13:
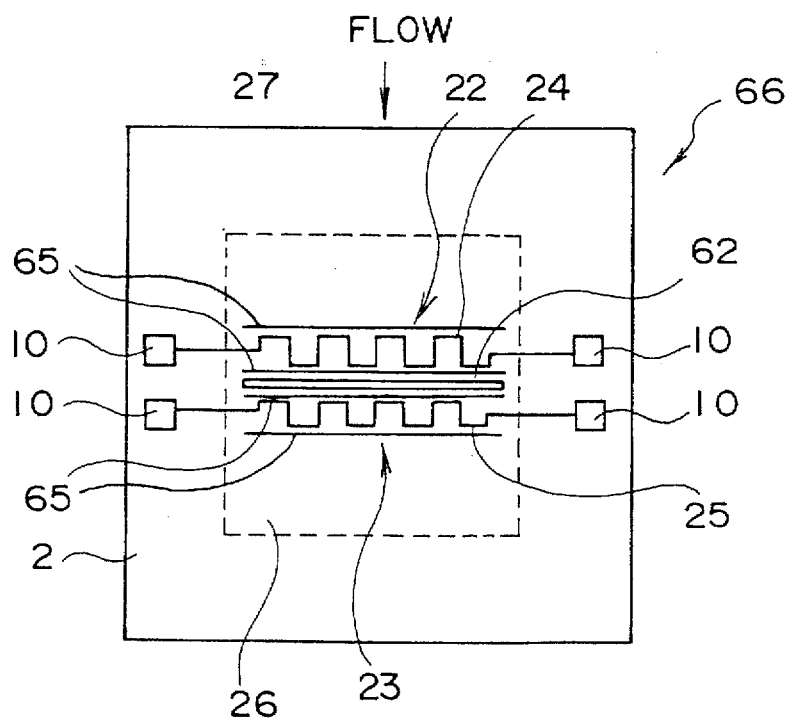
FIG. 13 is a fourth variation of the flow sensor shown in FIG. 9.

Additionally, a flow sensor 66 which is another variation of the flow sensor 61 is shown in FIG. 13. In the flow sensor 66, slits 65 are formed on each side of the isolation wall 62 and further on the upstream side of the thin-film heater 24 and on the downstream side of the thin-film heater 25. The slits 65 adjacent to the isolation wall 62 thermally insulate the isolation wall 62 from the first and second temperature detecting portions 22 and 23 so as to reduce the heat mass of a portion between the first and second temperature detecting portions 22 and 23. Thus, an increase in the heat mass due to the addition of the isolation wall 62 is eliminated, and thereby the sensitivity and the response of the flow sensor 61 is increased. Additionally, the slits 65 in on the upstream side of the thin-film heater 24 and on the downstream side of the thin-film heater 25 thermally insulate the corresponding temperature detecting portions 23 and 24.

It should be noted that the isolation wall 62 can be formed in a structure in which a portion of the thin-film supporting portion is curved to form the outer shape of the isolation wall 62 so that the isolation wall 62 has a cavity. This structure also reduces the heat mass of the isolation wall 62. Additionally, the structure of the isolation wall functions as a reinforcing member of the thin-film supporting portion 26. Thus, the endurance or service life of the flow sensor having the isolation wall 62 is increased.

Figure 2:
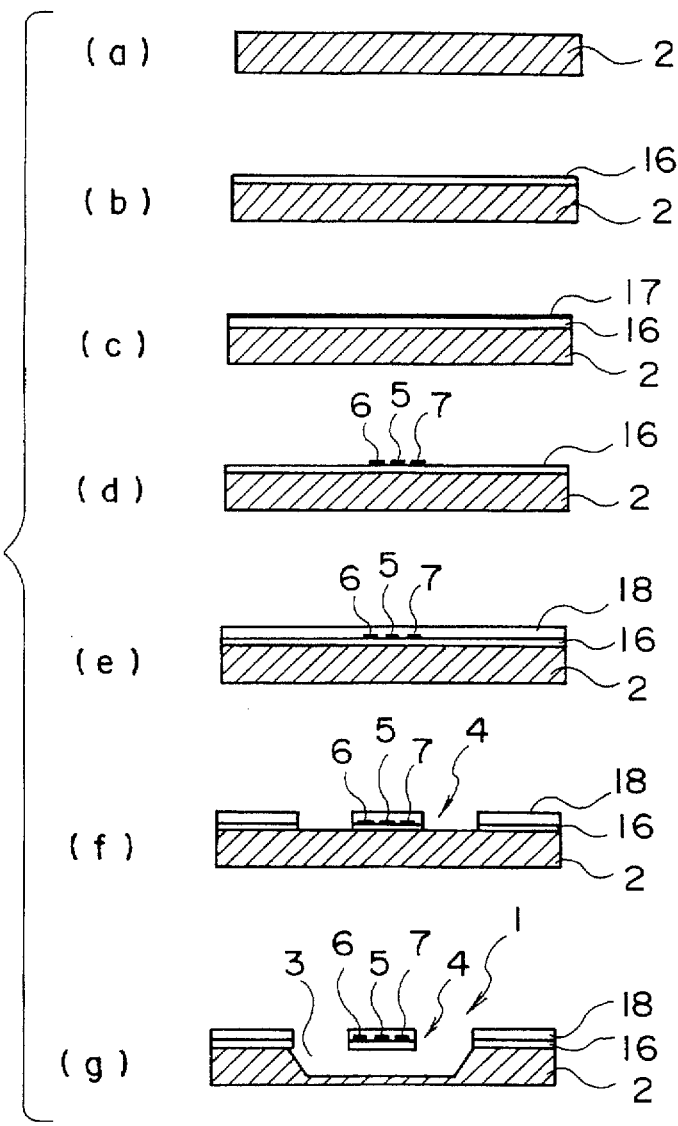
FIG. 2 is an illustration for explaining a manufacturing process of the flow sensor shown in FIG. 1.
Figure 14:
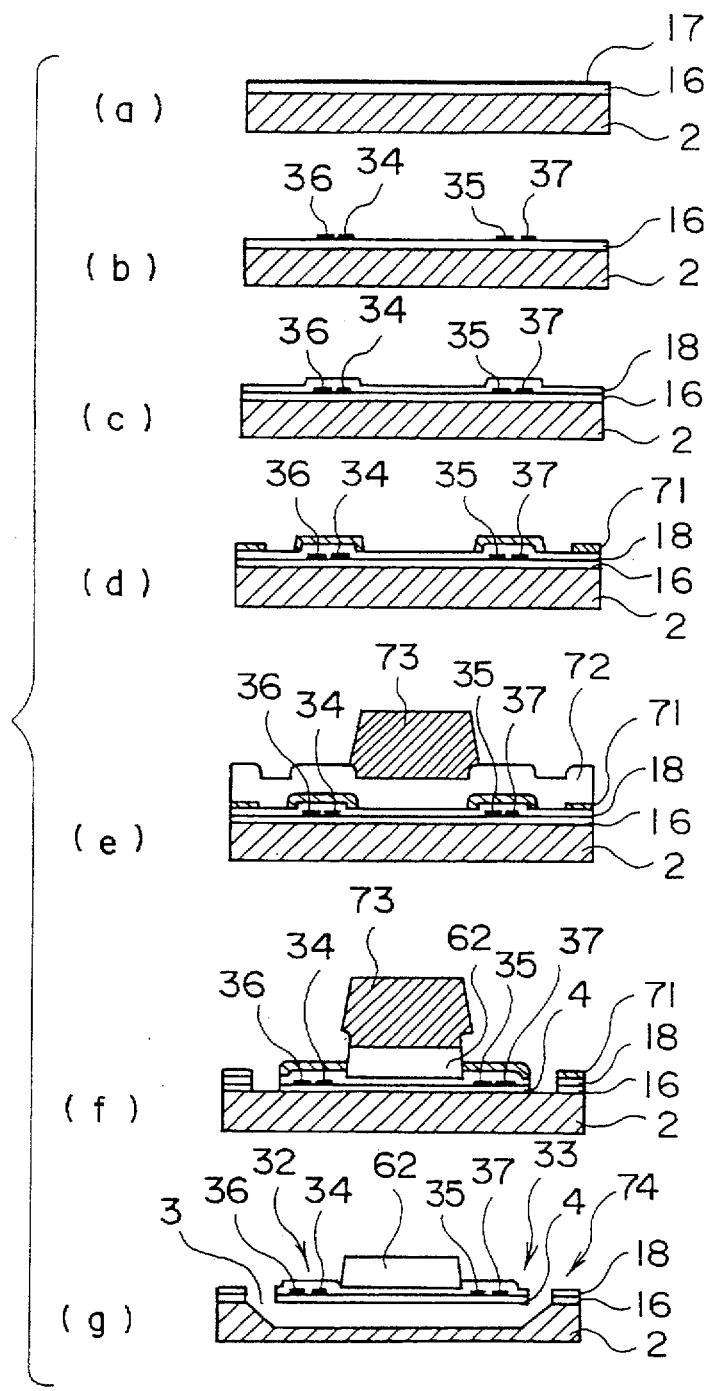
FIG. 14 is an illustration for explaining a manufacturing process for a flow sensor having an isolation wall.

A description will now be given, with reference to FIG. 14, of a manufacturing process of a flow sensor 74 having the isolation wall 62. In FIG. 14, parts that are the same as the parts shown in FIG. 2 are given the same reference numerals, and descriptions thereof will be omitted.

Although the manufacturing process shown in FIG. 14 is directed to the flow sensor 74 which has the bridge-like supporting portion 4 provided with the thin-film heaters 34 and 35 and the thin-film temperature sensors 36 and 37, the manufacturing process shown in FIG. 14 can be applied to other flow sensors having the isolation wall 62.

First, a single crystalline silicon substrate 2 having a square shape is prepared, and a first insulating thin-film 16 and a first metal thin-film 17 are sequentially formed on a surface of the substrate 2 as shown in FIG. 14-(a). The first insulating thin-film 16 is made of, for example, $SiO_2$, $Si_3N_4$ or $Ta_2O_5$, and is formed by a sputtering method or a chemical vapor deposition (CVD) method. In the present embodiment, the first insulating thin-film 16 is made of $Ta_2O_5$ having a thickness of 1.5 μm. The first metal thin-film 17 is made of, for example, Pt or Ni, and is formed by a sputtering method or a vacuum vapor deposition method. In the present embodiment, the first metal thin-film 17 is made of Pt having a thickness of 1200 A.

Thereafter, the first metal thin-film 17 is patterned to form the thin-film heaters 34 and 35 and the thin-film temperature sensors 36 and 37 by photo-lithography and etching as shown in FIG. 14-(b). Then, a second insulating thin-film 18 is formed, as a passivation layer, on the patterned thin-film heaters 34 and 35 and the thin-film temperature sensors 36 and 37 as shown in FIG. 14-(c). The second insulating thin-film 18 can be made of, for example, $SiO_2$, $Si_3N_4$ or $Ta_2O_5$, and is formed by a sputtering method or a chemical vapor deposition (CVD) method. In this embodiment, the second insulating film 18 is made of $Ta_2O_5$ having a thickness of 2000 A.

Thereafter, a second metal thin-film 19 is formed, as an etching stopper, on the surface of the second insulating thin-film 71. The second insulating thin-film 71 is patterned to be removed in a predetermined shape corresponding to the openings of the cavity 3. The second metal thin-film 71 can be made of Al or Ni and is formed by a sputtering method or a vacuum vapor deposition method. In the present embodiment, the second metal thin-film 71 is made of Al having a thickness of 2000 A. The patterning can be performed by photo-lithography or wet etching. In the present embodiment, portions corresponding to the openings of the cavity 3, isolation wall 62 and electrode terminals 10 are removed by etching.

Thereafter, a third insulating thin-film 72 is formed on the surface, and then a photoresist 73 is applied on the surface of the third insulating thin-film 72 in a shape corresponding to the isolation wall 62 as shown in FIG. 14-(e). The third insulating thin-film 72 can be made of, for example, $SiO_2$, $Si_3N_4$ or $Ta_2O_5$, and is formed by sputtering method or a chemical vapor deposition (CVD) method. In this embodiment, the third insulating thin-film 72 is made of $Ta_2O_5$ having a thickness of 4 μm.

Thereafter, the surface of the substrate 2 is exposed, as shown in FIG. 14-(f), in a shape corresponding to the removed portions of the second metal thin-film 71 by removing the third insulating thin-film 72 and the second insulating thin-film 18 while the third insulating thin-film 72 is maintained under the photoresist 73. That is, since openings corresponding to the openings of the cavity 3 are formed in the first and second insulating thin-films 16 and 18 which are sequentially formed on the surface of the substrate 2, the first and second insulating thin-films 16 and 18 are patterned to be in the shape of the supporting portion 4. The third insulating thin-film 72 formed on the supporting portion 4 is patterned to be in the shape of the isolation wall 62.

Thereafter, the photoresist 73 and the second metal thin-film 71 are removed by sulfuric acid and hydrogen peroxide. Then, the cavity 3 is formed on the back side of the supporting portion 4 by anisotropic etching using a KOH solution as shown in FIG. 14-(g). Then the flow sensor 74 having the isolation wall 62 is completed.

In the manufacturing process shown in FIG. 14, the isolation wall 62 can be easily formed on the supporting portion 4 between the first and second temperature detecting portions 22 and 23. Additionally, the etching of the third insulating thin-film 72 for forming the isolation wall 62 and the etching of the first and second insulating thin-films 16 and 18 for forming the openings of the cavity 3 are carried out in the same process. Thus, the number of manufacturing processes is reduced, and a high production rate is obtained.

As mentioned above, when the first to third insulating thin-films 16, 18 and 72 are etched at the same time, it is possible that a portion of the first and second insulating thin-films 16 and 18 corresponding to the supporting portion 4 is also undesirably etched. However, in this embodiment, since the portion of the first and second insulating thin-films 16 and 18 corresponding to the supporting portion 4 is protected by the second metal thin-film 71, the portion corresponding to the supporting portion 4 is not etched. Additionally, the second metal thin-film 71 and the photoresist 73 are removed by a regular washing process, there is no need to provide an additional process for exclusively removing the second metal thin-film 71 and the photoresist 73.

Figure 15:
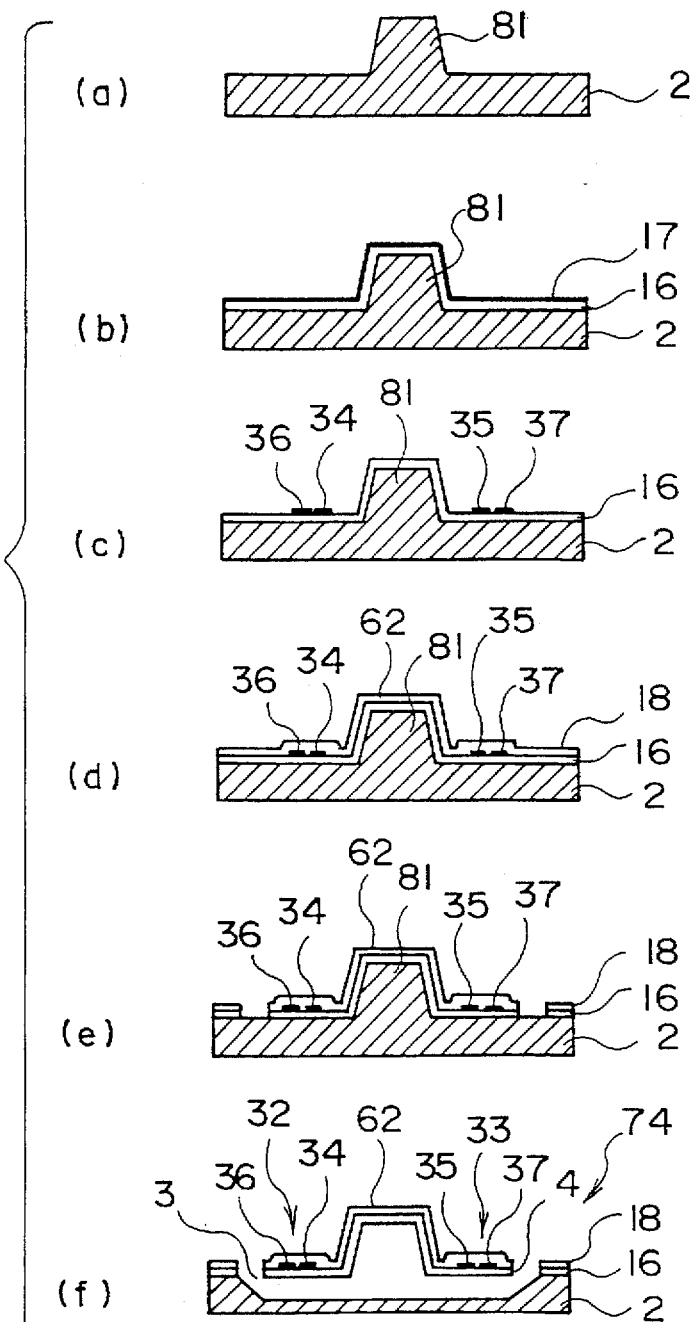
FIG. 15 is an illustration for explaining another manufacturing process for the flow sensor having the isolation wall provided with a cavity on the back side.

A description will now be given, with reference to FIG. 15, of a manufacturing process of the flow sensor 74 having the isolation wall 62 in which a cavity is formed from the back side. In FIG. 15, parts that are the same as the parts shown in FIG. 14 are given the same reference numerals, and descriptions thereof will be omitted.

First, a single crystalline silicon substrate 2 having a square shape is prepared, and the substrate 2 is etched to form a projection 81 as shown in FIG. 15-(a). The projection 81 corresponds to the cavity formed on the back side of the isolation wall 62. The projection 81 can be formed by photo-lithography or dry etching. In this embodiment, the projection 81 is formed with a height of 4 μm by dry etching using a gas mixture containing $CF_4$ and $CCl_4$.

Thereafter, a first insulating thin-film 16 and a first metal thin-film 17 are sequentially formed on the surface of the substrate 2 as shown in FIG. 15-(b). Then, the metal thin-film 17 is patterned to form the thin-film heaters 34 and 35 and the thin-film temperature sensors 36 and 37 as shown in FIG. 15-(c). Then, a second insulating thin-film 18 is formed, as a passivation layer, on the patterned thin-film heaters 34 and 35 and the thin-film temperature sensors 36 and 37 as shown in FIG. 15-(d). Thereafter, the first and second insulating thin-films 16 and 18 are patterned, as shown in FIG. 15-(e) to form the thin-film supporting portion 4 by photo-lithography and etching so that portions of the surface of the substrate 2 are exposed in the form of the end openings of the cavity 3. Then, the cavity 3 is formed, as shown in FIG. 15-(f), between the end openings and under the thin-film supporting portion 4 by an anisotropic etching method using a KOH solution, and the manufacturing process of the flow sensor 74 is completed.

In the manufacturing process shown in FIG. 15, the flow sensor 74 having the isolation wall 62 can be easily formed on the supporting portion 4 between the first and second temperature detecting portions 22 and 23. Additionally, since the isolation wall is formed as a curved portion of the supporting portion 4, the isolation wall 62 is provided with a cavity on the back side. Thus, the heat mass of the isolation wall 62 is reduced, and thereby the sensitivity and the productivity of the flow sensor 74 is high.

It should be noted that an angle of the side surfaces of the protrusion 81 can be controlled by changing a mixing ratio of $CF_4$ and $CCL_4$ contained in the gas used for dry etching. Thus, the isolation wall 62 can be formed in a desired shape. Considering that the first metal thin-film 17 is etched, it is preferred that the side surfaces of the projection 81 are inclined.

Figure 16:
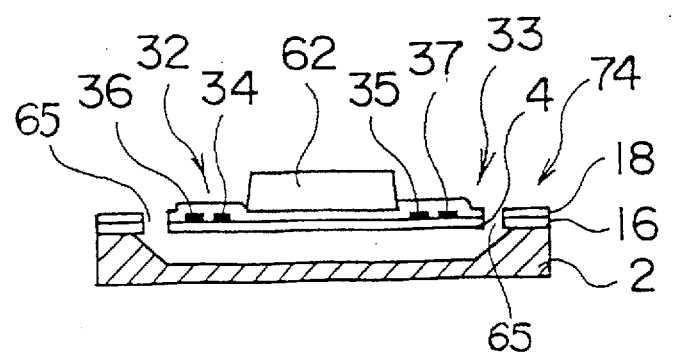
FIG. 16 is a cross-sectional view of a flow sensor manufactured by a method similar to the method shown in FIG. 14.

In the manufacturing method shown in FIG. 14, the openings 3 can be replaced by the slits 65 similar to the flow sensor shown in FIG. 13. In this case, the cavity under the supporting portion can be etched through the slits 65 as shown in FIG. 16. The flow sensor 74 shown in FIG. 16 can be manufactured by a method similar to the method described with reference to FIG. 14. The illustration shown in FIG. 16 corresponds to the illustration FIG. 14-(g).

Figure 17:
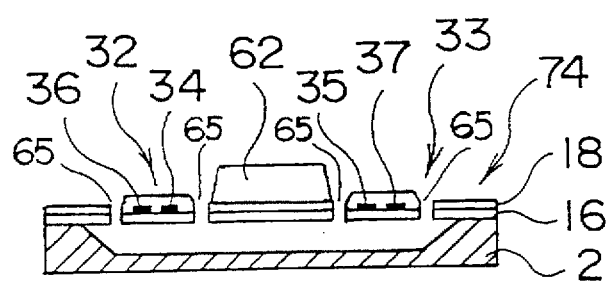
FIG. 17 is a cross-sectional view of another flow sensor manufactured by the method shown in FIG. 14.

Additionally, in the flow sensor shown in FIG. 16, the slits 65 can also be formed adjacent to the isolation wall 62 as shown in FIG. 17. Apparently, the flow sensor shown in FIG. 17 can be manufactured by a method similar to the method described with reference to FIG. 14.

Figure 18:
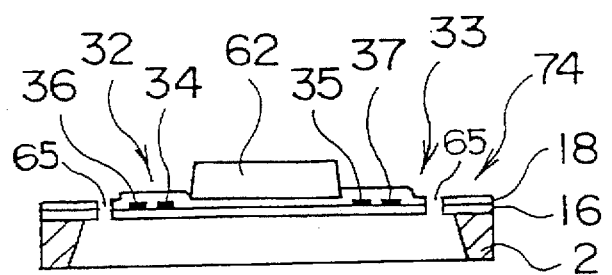
FIG. 18 is a cross-sectional view of a flow sensor having a cavity etched from a back side of a substrate.

Additionally, in the process shown in FIG. 14, the process for forming the cavity or depression, which is shown in FIG. 14-(g) can be replaced by a process in which the cavity or depression is formed by etching from the back side of the substrate 2 as shown in FIG. 18. This method corresponds to a method for manufacturing the flow sensor having the diaphragm structure.

In the present invention mentioned above, the features of each of the embodiments may be combined to achieve an appropriate function. That is, for example, although the isolation wall 62 is provided in the fifth embodiment, the isolation wall may be provided any one of first to fourth embodiments if it is appropriate.

The present invention is not limited to the specifically disclosed embodiments, and variations and modifications may be made without departing from the scope of the present invention.

What is claimed is:

1. A flow sensor for measuring a flow rate of a fluid, comprising:
   a substrate;
   a first temperature detecting portion and a second temperature detecting portion each having a heating function and a temperature detecting function, said first temperature detecting portion and said second temperature detecting portion being arranged in a direction of flow of said fluid; and
   a supporting portion, formed on said substrate, for supporting said first and second temperature detecting portions thereon, said supporting portion lacking a side surface facing substantially in the direction of flow of said fluid.

2. The flow sensor as claimed in claim 1, wherein said supporting portion has a diaphragm structure to cover an opening formed in said substrate so that said flow sensor has substantially a flat surface on a side where said first and second temperature detecting portions are formed.

3. The flow sensor as claimed in claim 2, further comprising a slit formed between said first and second temperature detecting portions.

4. The flow sensor as claimed in claim 2, further comprising an isolation wall projecting from said supporting portion, said isolation wall being positioned between said first and second temperature detecting portions.

5. The flow sensor as claimed in claim 4, further comprising a second isolation wall on a downstream side of said second temperature detecting portion.

6. The flow sensor as claimed in claim 4, further comprising a slit formed in said supporting portion, said slit positioned between said isolation wall and one of said first and second temperature detecting portion.

7. The flow sensor as claimed in claim 4, further comprising first and second slits formed in said supporting portion, said first slit positioned between said isolation wall and said first temperature detecting portion, said second slit positioned between said isolation wall and said second temperature detecting portion.

8. The flow sensor as claimed in claim 4, further comprising third and fourth slits formed in said supporting portion, said third slit positioned on the upstream side of said first temperature detecting portion, said fourth slit positioned on the downstream side of said second temperature detecting portion.

9. The flow sensor as claimed in claim 4, wherein said isolation wall is an integral part of said supporting portion.

10. The flow sensor as claimed in claim 4, wherein said isolation wall has a hollow structure.

11. The flow sensor as claimed in claim 2, wherein each of said first and second temperature detecting portions comprises a thin-film heater having a thermistor function.

12. The flow sensor as claimed in claim 2, wherein each of said first and second temperature detecting portions comprises a thin-film heater and a thin-film temperature sensor positioned adjacent to said thin-film heater.

13. The flow sensor as claimed in claim 1, wherein said supporting portion has a bridge-like structure extending in the direction of flow of said fluid, said supporting portion bridging over a cavity formed in said substrate so that said flow sensor has substantially a flat surface on a side where said first and second temperature detecting portions are formed.

14. The flow sensor as claimed in claim 13, further comprising a slit formed between said first and second temperature detecting portions.

15. The flow sensor as claimed in claim 13, further comprising an isolation wall projecting from said supporting portion, said isolation wall being positioned between said first and second temperature detecting portions.

16. The flow sensor as claimed in claim 13, further comprising a second isolation wall on a downstream side of said second temperature detecting portion.

17. The flow sensor as claimed in claim 13, further comprising a slit formed in said supporting portion, said slit positioned between said isolation wall and one of said first and second temperature detecting portion.

18. The flow sensor as claimed in claim 13, further comprising first and second slits formed in said supporting portion, said first slit positioned between said isolation wall and said first temperature detecting portion, said second slit positioned between said isolation wall and said second temperature detecting portion.

19. The flow sensor as claimed in claim 18, further comprising third and fourth slits formed in said supporting portion, said third slit positioned on the upstream side of said first temperature detecting portion, said fourth slit positioned on the downstream side of said second temperature detecting portion.

20. The flow sensor as claimed in claim 13, wherein said isolation wall is an integral part of said supporting portion.

21. The flow sensor as claimed in claim 20, wherein said isolation wall has a hollow structure.

22. The flow sensor as claimed in claim 13, wherein each of said first and second temperature detecting portions comprises a thin-film heater having a thermistor function.

23. The flow sensor as claimed in claim 13, wherein each of said first and second temperature detecting portions comprises a thin-film heater and a thin-film temperature sensor positioned adjacent to said thin-film heater.

24. The flow sensor as claimed in claim 1, further comprising a slit formed between said first and second temperature detecting portions.

25. The flow sensor as claimed in claim 24, further comprising an isolation wall projecting from said supporting portion, said isolation wall being positioned between said first and second temperature detecting portions.

26. The flow sensor as claimed in claim 25, further comprising a second isolation wall on a downstream side of said second temperature detecting portion.

27. The flow sensor as claimed in claim 25, further comprising a slit formed in said supporting portion, said slit positioned between said isolation wall and one of said first and second temperature detecting portion.

28. The flow sensor as claimed in claim 25, further comprising first and second slits formed in said supporting portion, said first slit positioned between said isolation wall and said first temperature detecting portion, said second slit positioned between said isolation wall and said second temperature detecting portion.

29. The flow sensor as claimed in claim 28, further comprising third and fourth slits formed in said supporting portion, said third slit positioned on the upstream side of said first temperature detecting portion, said fourth slit positioned on the downstream side of said second temperature detecting portion.

30. The flow sensor as claimed in claim 25, further comprising a second isolation wall on the downstream side of said second temperature detecting portion and a second slit positioned between said second temperature detecting portion and said second isolation wall.

31. The flow sensor as claimed in claim 25, wherein said isolation wall is an integral part of said supporting portion.

32. The flow sensor as claimed in claim 13, further comprising a guard portion formed along a side surface of said supporting portion.

33. The flow sensor as claimed in claim 32, wherein said guard portion is higher than said supporting portion.

34. The flow sensor as claimed in claim 31, wherein said isolation wall has a hollow structure.

35. A method of manufacturing a flow sensor comprising first and second temperature detecting portions formed over a cavity formed in a substrate, an isolation wall being formed between said first and second temperature detecting portions, the manufacturing method comprising the steps of:
   a) forming a first insulating film and a first metal film sequentially on a single crystalline silicon substrate;
   b) patterning said first metal film to form said first and second temperature detecting portions;
   c) forming a second insulating film as a passivation;
   d) forming a second metal film as an etching stopper;
   e) patterning said second metal film to remove said second metal film in a shape corresponding to an opening of said cavity;
   f) forming a third insulating film;
   g) applying a resist on said third insulating film in a shape corresponding to said isolation wall;
   h) removing said first, second and third insulating films by etching so that said third insulating film remains under said resist and said first and second insulating films remain under said second metal film; and
   i) forming said cavity by anisotropic etching through removed portions of said first and second insulating film.

36. A method of manufacturing a flow sensor comprising first and second temperature detecting portions formed over a cavity formed in a substrate, an isolation wall being formed between said first and second temperature detecting portions, the manufacturing method comprising the steps of:
   a) forming a projection on a single crystalline silicon substrate, said projection having a contour corresponding to said isolation wall;
   b) forming a first insulating film and a first metal film sequentially on said single crystalline silicon substrate;
   c) patterning said first metal film to form said first and second temperature detecting portions;
   d) forming a second insulating film as a passivation;
   e) patterning said first and second insulating films so that portions of said single crystalline silicon substrate are exposed in shapes corresponding to openings of said cavity; and
   f) forming said cavity by anisotropic etching through said exposed portions of said single crystalline silicon substrate.

* * * * *